(No Model.)
W. W. GROGAN & J. H. WAX.
HOOF TRIMMER.
No. 562,526. Patented June 23, 1896.
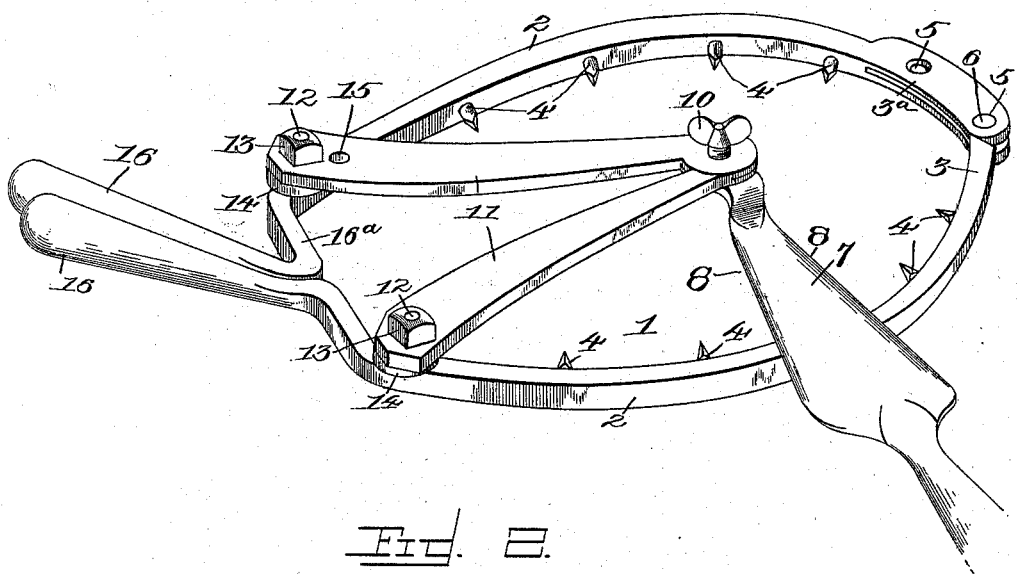
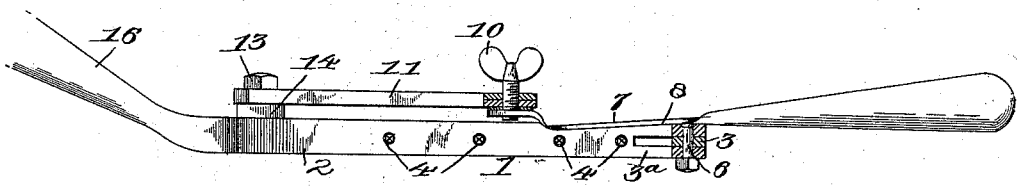
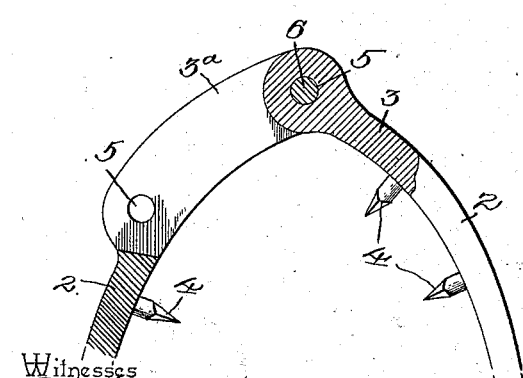
Witnesses
T. L. McKater
J. F. Riley
Inventors
William W. Grogan
Joseph H. Wax,
By their Attorneys,
C. A. Snow & Co.

UNITED STATES PATENT OFFICE.

WILLIAM W. GROGAN AND JOSEPH H. WAX, OF GATE CITY, VIRGINIA, ASSIGNORS OF ONE-HALF TO R. F. McCONNELL, OF SAME PLACE.

HOOF-TRIMMER.

SPECIFICATION forming part of Letters Patent No. 562,526, dated June 23, 1896.

Application filed April 1, 1896. Serial No. 585,764. (No model.)

*To all whom it may concern:*

Be it known that we, WILLIAM W. GROGAN and JOSEPH H. WAX, citizens of the United States, residing at Gate City, in the county of Scott and State of Virginia, have invented a new and useful Hoof-Trimmer, of which the following is a specification.

The invention relates to improvements in hoof-trimmers.

The object of the present invention is to improve the construction of hoof-trimmers and to provide a simple, inexpensive, and efficient device adapted to be quickly applied to and removed from a hoof, to expedite the operation of trimming and to enable it to be quickly detached should an animal become unruly, and capable of rapidly and accurately trimming a hoof and of properly preparing the same for the reception of a shoe, to enable the latter to fit perfectly, so as not to interfere with the travel of the animal.

A further object of the invention is to provide a hoof-trimmer which will be capable of ready adjustment, to adapt it to hoofs of various sizes, and in which the pivotal point of the knife will be automatically carried backward from the front of the device and forward toward the same, accordingly as the device is increased or diminished in size, in order that the knife may at all times be properly fulcrumed with relation to the hoof to be trimmed.

Another object of the invention is to enable the knife to be readily adjusted, to depress or raise the blade in order to pare a hoof the necessary depth.

The invention consists in the construction of a novel combination and arrangement of parts hereinafter fully described, illustrated in the accompanying drawings, and pointed out in the claims hereto appended.

In the drawings, Figure 1 is a perspective view of the hoof-trimmer constructed in accordance with this invention. Fig. 2 is a longitudinal sectional view of the same. Fig. 3 is a detail sectional view of the adjustable hinge-joint. Fig. 4 is a similar view illustrating the manner of pivoting the links of the toggle connection on the clamping-frame.

Like numerals of reference designate corresponding parts in the figures of the drawings.

1 designates an adjustable clamping-frame, constructed of any suitable material and composed of two sides 2, hinged at their front ends 3 and $3^a$ and curved to conform generally to the configuration of a hoof and presenting inner concave faces to the same. The sides 2 of the clamping-frame are resilient, and are provided at their inner concave faces with inwardly-projecting spurs or points 4, adapted to engage a hoof, whereby the clamping-frame is firmly held against slipping or accidental movement on the hoof.

The front end 3 of one side of the clamping-frame is provided with an eye, and the front end $3^a$ of the other side of the clamping-frame is bifurcated to receive the eye and is provided with perforations 5, adapted for the reception of a pivot 6, which also passes through the eye of the end 3, and by this construction the sides of the frame may be adjusted to increased or diminished size of the frame. Any number of perforations may be provided to obtain the desired adjustment, and the pivot 6 consists, preferably, of a bolt provided with a nut and adapted to be readily removed to enable the sides of the frame to be quickly adjusted.

The outer edges of the sides 2 of the clamping-frame form guides for the knife 7, which is pivoted centrally of the clamping-frame, and adapted to be swung around the same in either direction and provided at both sides with cutting edges 8 to enable it to cut when swung in either direction. The knife, which is provided with a trowel-shaped blade and which has a suitable handle, is slightly curved adjacent to its inner end to enable it to cut a hoof sufficiently concavely to prepare it properly for a shoe and to enable a perfect fit of the latter to be obtained, to prevent the shoe from interfering in any manner with the travel of the animal.

The inner end of the knife, which is provided with an eye, is pivoted by the set-screw 10 to the adjacent ends of a pair of forwardly-converging link-bars or braces 11, pivoted at their rear ends to the sides 2 of the frame adjacent to the rear ends thereof and forming a toggle connection between the inner end of the knife and the sides of the clamping-frame, whereby when the latter is adjusted to vary its diameter to accommodate all sizes of hoofs the pivot of the knife will automatically move forward and rearward in order to arrange the fulcrum of the knife centrally of a hoof. The set-screw 10 is adapted to elevate or depress the inner end of the blade to enable a hoof to be pared the desired depth, and the knife may be readily removed when it is desired to sharpen it. The link-bars or braces 11 are provided, at their front ends, with threaded perforations to receive the set-screw, and the knife is provided with a similarly-threaded perforation, and the threads of the screw are of such a number to the inch that the movement of the knife on the clamping-frame will not materially alter its position on the screw.

The rear ends of the links or braces of the toggle connections are mounted on pivots 12 of the clamping-frame, and are secured on them by nuts 13, spacing collars or washers 14 being interposed between the lower or inner faces of the link-bars or braces and the upper edges of the sides of the clamping-frame to arrange the former at the proper elevation to permit a free swing of the knife.

The rear end of the link-bar or brace adjacent to the bifurcated side of the clamping-frame is provided with a series of perforations 15, to enable the toggle connection to be adjusted similarly to the hinge-joint, so the knife will always be centrally located as to the hoof. The knife is guided on the outer edges of the sides of the clamping-frame, it is capable of swinging the frame in either direction, and it will cut with either movement, and by being guided in this manner an inexperienced person can accurately pare a hoof.

A pair of handles 16 is formed integral with the rear ends of the sides of the clamping-frame, they extend rearward and outward, being arranged at a slight angle to the sides of the clamping-frame, and the inner portions 16ª are angularly bent and laterally offset to space the sides of the clamping-frame sufficiently when the handles are in actual contact.

It will be seen that the hoof-trimmer is exceedingly simple and inexpensive in construction, that it is adapted to be readily adjusted to suit the size of any hoof, and that it is capable of rapidly and accurately trimming the same to prepare a hoof properly for the reception of a shoe and to enable the latter to fit perfectly. It will also be apparent that the hoof-trimmer may be readily applied to and removed from a hoof, that the knife may be readily adjusted to pare a hoof the desired depth and may be easily detached when it is desired to sharpen it, and that the clamping-frame forms a perfect guide, so that a hoof may be properly and accurately trimmed by an inexperienced person.

Changes in the form, proportion, and minor details of the construction may be resorted to without departing from the spirit or sacrificing any of the advantages of the invention.

What we claim is—

1. A hoof-trimmer, comprising a clamping-frame conforming to the configuration of a hoof and composed of sides capable of lateral movement to adjust the clamping-frame to suit the size of a hoof, a pair of forwardly-converging links or braces, pivoted at their rear ends to the sides of the frame at the back thereof, having their front ends pivotally connected centrally on the frame and forming a toggle-joint, and a pivoted knife connected to and carried by the front ends of the braces or link-bars, whereby the knife is automatically adjusted simultaneously with the adjustment of the clamping-frame, substantially as described.

2. A hoof-trimmer, comprising a clamping-frame composed of curved sides, one of the sides being provided with an eye and the other being bifurcated and provided with a series of perforations a pivot passing through the eye of one of the sides and adapted to be arranged in any of the said perforations, whereby the sides of the frames are adjustably connected, a pair of forward-converging link-bars pivoted at their front ends and similarly connected at their rear ends to the sides of the frame to form a toggle connection, the rear end of one of the link-bars being adjustably connected with the bifurcated side of the frame, and a pivoted knife connected to the front ends of the link-bars, substantially as and for the purpose described.

In testimony that we claim the foregoing as our own we have hereto affixed our signatures in the presence of two witnesses.

WILLIAM W. GROGAN.
JOSEPH H. WAX.

Witnesses:
  G. M. EDMONDS,
  R. R. KANE.